(12) United States Patent
Yan et al.

(10) Patent No.: US 10,187,462 B2
(45) Date of Patent: Jan. 22, 2019

(54) METHODS, SYSTEM, AND SERVER FOR CONSTRUCTING MICROBLOG MANAGEMENT CIRCLE

(71) Applicant: TENCENT TECHNOLOGY (SHENZHEN) COMPANY LIMITED, Shenzhen (CN)

(72) Inventors: Xiaokun Yan, Shenzhen (CN); Yiqun Xie, Shenzhen (CN); Chang Liu, Shenzhen (CN); Guangyu Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 356 days.

(21) Appl. No.: 15/213,692

(22) Filed: Jul. 19, 2016

(65) Prior Publication Data

US 2016/0330276 A1    Nov. 10, 2016

Related U.S. Application Data

(63) Continuation of application No. PCT/CN2015/078741, filed on May 12, 2015.

(30) Foreign Application Priority Data

May 12, 2014  (CN) .......................... 2014 1 0198058

(51) Int. Cl.
*H04L 29/08* (2006.01)
*G06F 17/30* (2006.01)
(Continued)

(52) U.S. Cl.
CPC ....... *H04L 67/1044* (2013.01); *G06Q 10/105* (2013.01); *G06Q 50/01* (2013.01); *H04L 67/02* (2013.01)

(58) Field of Classification Search
USPC ......................................................... 709/204
See application file for complete search history.

(56) References Cited

U.S. PATENT DOCUMENTS

2011/0178995 A1* 7/2011 Suchter ............. G06F 17/30864
707/692
2013/0246430 A1  9/2013 Szucs
(Continued)

FOREIGN PATENT DOCUMENTS

CN       103095548 A    5/2013
EP         2618529 A1   7/2013

OTHER PUBLICATIONS

The World Intellectual Property Organization (WIPO) International Search Report for PCT/CN2015/078741 dated Jul. 30, 2015 p. 1-4.

*Primary Examiner* — Jude Jean Gilles
(74) *Attorney, Agent, or Firm* — Anova Law Group, PLLC

(57) ABSTRACT

The present disclosure provides methods, a system, and a server for constructing a microblog management circle. One method includes: setting, by a server, a microblog account 1 as a main official account; and receiving, by the server, a message indicating that a microblog account 2 is used as a sub official account subordinate to the main official account, setting, according to the message, the microblog account 2 as the sub official account subordinate to the main official account, and displaying operational data of the sub official account subordinate to the main official account to the main official account. In the present disclosure, an architecture of a hierarchical microblog management circle can be constructed, making it easier for a manager of a microblog account to view operational data of the subordinate microblog account.

19 Claims, 7 Drawing Sheets

(51) Int. Cl.
*G06Q 10/10* (2012.01)
*G06Q 50/00* (2012.01)

(56) References Cited

U.S. PATENT DOCUMENTS

| | | | | |
|---|---|---|---|---|
| 2015/0350149 A1* | 12/2015 | Acharya | ............... | H04L 51/32 |
| | | | | 709/206 |
| 2016/0043972 A1* | 2/2016 | Lan | ..................... | H04L 51/32 |
| | | | | 709/206 |
| 2016/0307131 A1* | 10/2016 | Wang | ............. | G06Q 10/06311 |

* cited by examiner

US 10,187,462 B2

METHODS, SYSTEM, AND SERVER FOR CONSTRUCTING MICROBLOG MANAGEMENT CIRCLE

FIELD OF THE TECHNOLOGY

The present disclosure relates to the field of Internet technologies, and in particular, relates to methods, a system, and a server for constructing a microblog management circle.

BACKGROUND OF THE DISCLOSURE

With rapid development of the microblog and mobile Internet, the microblog has become a popular media platform, while conventional media is at a risk of being eliminated by the wave of Internet. Therefore, the operation of microblog accounts becomes increasingly important for the conventional media.

Due to the impact of Internet, the conventional media needs to retrieve a capability of agenda setting by using the microblog. At present, in authenticated media microblog accounts of a microblog platform, newspaper is still a main part of media microblogs.

At present, at least the following defects exist in microblog accounts of the conventional media.

First, microblog accounts are decentralized, and cannot form an ordered structure and a unified management circle; and second, a manager of a microblog account cannot effectively view operational data of a subordinate microblog account.

SUMMARY

The present disclosure provides two methods for constructing a microblog management circle, so that an architecture of a hierarchical microblog management circle can be constructed, making it easier for a manager of a microblog account to view operational data of a subordinate microblog account.

The present disclosure provides a system and a server for constructing a microblog management circle, so that an architecture of a hierarchical microblog management circle can be constructed, making it easier for a manager of a microblog account to view operational data of a subordinate microblog account.

Technical solutions of the present disclosure are implemented in the following manner:

A method for constructing a microblog management circle includes:

setting, by a server, a microblog account 1 as a main official account; and receiving, by the server, a message indicating that a microblog account 2 is used as a sub official account subordinate to the main official account, setting, according to the message, the microblog account 2 to the sub official account subordinate to the main official account, and displaying operational data of the sub official account subordinate to the main official account to the main official account.

A method for constructing a microblog management circle includes:

setting, by a server, a microblog account 1 as a main official account;

sending, by the main official account or a microblog account 2, a message indicating that the microblog account 2 is used as a sub official account subordinate to the main official account to the server; and setting, by the server according to the message, the microblog account 2 to the sub official account subordinate to the main official account, and displaying operational data of the sub official account subordinate to the main official account to the main official account.

A system for constructing a microblog management circle includes:

a client, configured to send a message indicating that a microblog account is used as a sub official account subordinate to a main official account to a server; and a server, configured to set the main official account; set, when the message is received, the microblog account to the sub official account subordinate to the main official account; and display operational data of the sub official account to the main official account.

A server for constructing a microblog management circle includes:

a management circle construction module, configured to set a microblog account 1 as a main official account, and set, when a message indicating that a microblog account 2 is used as a sub official account subordinate to the main official account is received, the microblog account 2 to the sub official account subordinate to the main official account; and an operational data management module, configured to display operational data of the sub official account subordinate to the main official account to the main official account.

As such, according to the disclosed methods, the system, and the server for constructing a microblog management circle, a hierarchical structure including a main official account, a sub official account, and a personal account, is constructed, thereby implementing effective management and an effective architecture of a microblog circle, and making it easier for a main official account to view operational data of a subordinate microblog account.

DESCRIPTION OF EMBODIMENTS

Figure 1:
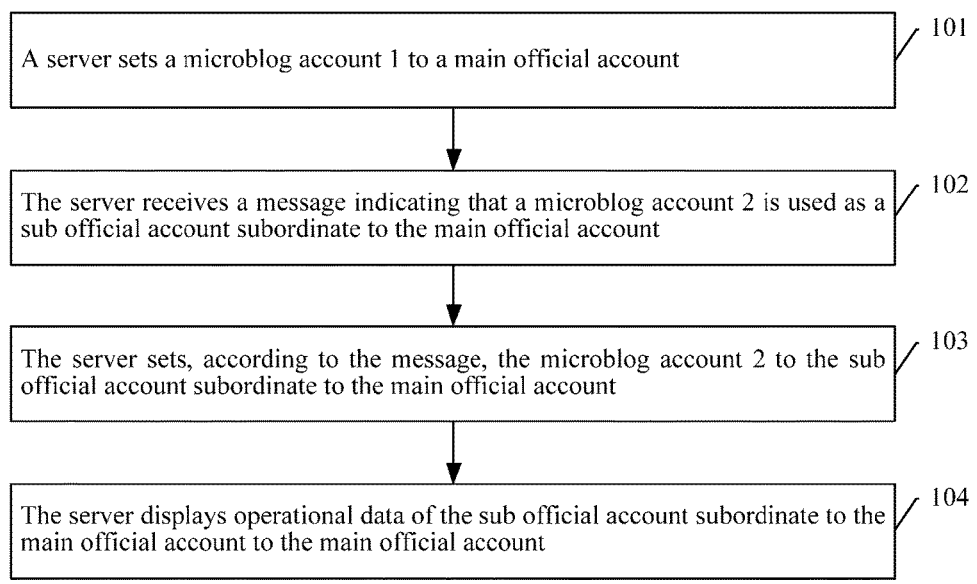
FIG. 1 is an implementation flowchart of an exemplary method for constructing a microblog management circle according to the present disclosure.

The present disclosure provides a method for constructing a microblog management circle. FIG. 1 is an implementation flowchart of the method, which includes:

Step 101: A server sets a microblog account 1 as a main official account.

Step 102: The server receives a message indicating that a microblog account 2 is used as a sub official account subordinate to the main official account.

Step 103: The server sets, according to the message, the microblog account 2 as the sub official account subordinate to the main official account.

Step 104: The server displays operational data of the sub official account subordinate to the main official account to the main official account.

In the foregoing method, a process of setting the microblog account 2 as the sub official account subordinate to the main official account may be initiated by the server, the main official account, or the microblog account 2, the message in step 102 may be sent to the server by the main official account or the microblog account 2.

In one embodiment, after step 101, the method may further include: sending, by the main official account, invitation information to the microblog account 2; and acknowledging, by the microblog account 2, that the microblog account 2 agrees to be used as the sub official account subordinate to the main official account, and sending the message indicating that the microblog account 2 is used as the sub official account subordinate to the main official account to the server; or after step 101, the method may further include: sending, by the main official account, invitation information to the microblog account 2, feeding back, by the microblog account 2, acknowledgement information to the main official account, and sending, by the main official account, the message indicating that the microblog account 2 is used as the sub official account subordinate to the main official account to the server; or after step 101, the method may further include: sending, by the microblog account 2, invitation information to the main official account; and acknowledging, by the main official account, that the main official account agrees to use the microblog account 2 as the sub official account subordinate to the main official account, and sending the message indicating that the microblog account 2 is used as the sub official account subordinate to the main official account to the server; or after step 101, the method may further include: sending, by the microblog account 2, invitation information to the main official account, feeding back, by the main official account, acknowledgement information to the microblog account 2, and sending, by the microblog account 2, the message indicating that the microblog account 2 is used as the sub official account subordinate to the main official account to the server; or after step 101, the method may further include: sending, by the server, invitation information indicating that the microblog account 2 is used as the sub official account subordinate to the main official account to the main official account and the microblog account 2 separately; sending, by the microblog account 2, acknowledgement information to the main official account; and acknowledging, by the main official account, that the main official account agrees to use the microblog account 2 as the sub official account subordinate to the main official account, and sending the message indicating that the microblog account 2 is used as the sub official account subordinate to the main official account to the server; or after step 101, the method may further include: sending, by the server, invitation information indicating that the microblog account 2 is used as the sub official account subordinate to the main official account to the main official account and the microblog account 2 separately; sending, by the main official account, acknowledgement information to the microblog account 2; and acknowledging, by the microblog account 2, that the microblog account 2 agrees to be used as the sub official account subordinate to the main official account, and sending the message indicating that the microblog account 2 is used as the sub official account subordinate to the main official account to the server.

A hierarchical microblog management circle including the main official account and the sub official account is established by using the foregoing process.

The foregoing method may further include: receiving, by the server, a request for using a microblog account 3 as a subordinate account of the sub official account subordinate to the main official account, setting, according to the request, the microblog account 3 as a personal account subordinate to the sub official account, and displaying operational data of the personal account subordinate to the sub official account to the main official account.

By using the foregoing process, the hierarchical microblog management circle is expanded into 3 levels, including the main official account, the sub official account, and the personal account. For example, FIG. 2 is a schematic structural diagram of the architecture.

Figure 2:
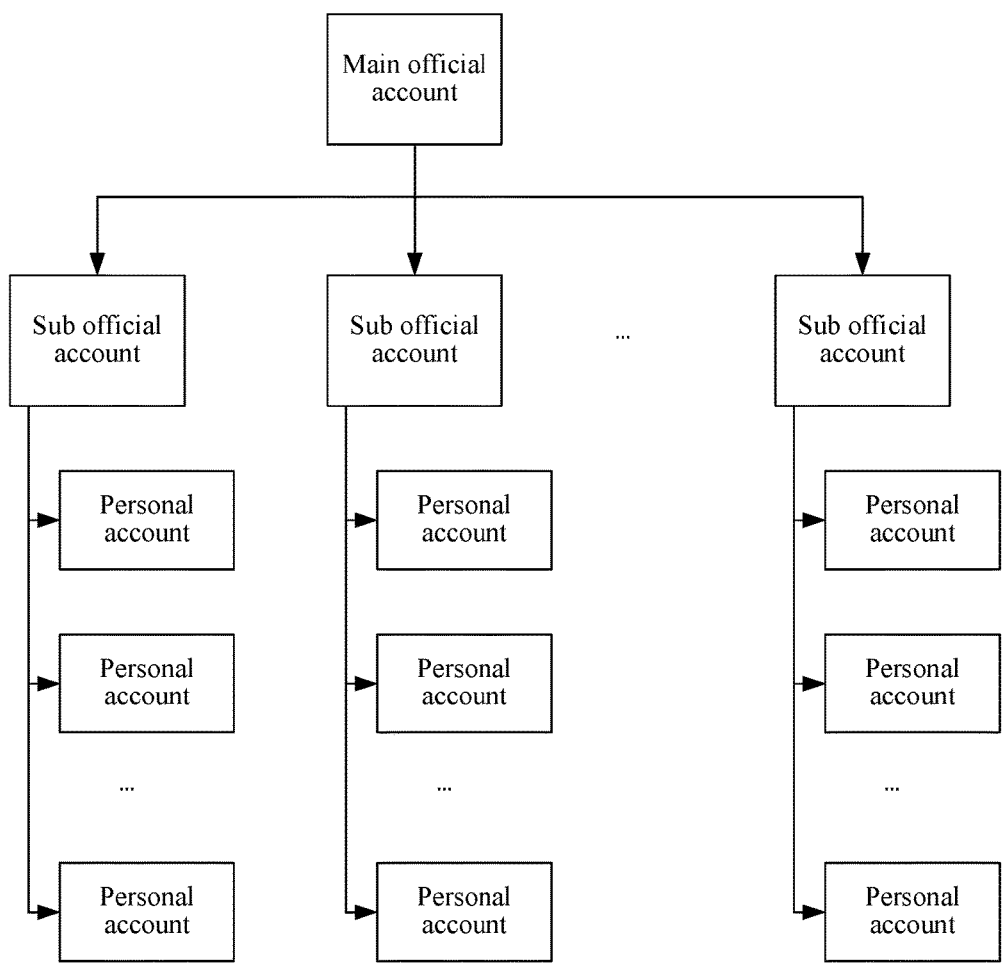
FIG. 2 is a schematic structural diagram of an exemplary constructed microblog management circle according to the present disclosure.

In the hierarchical architecture shown in FIG. 2, the main official account, the sub official account, and the personal account are all microblog accounts, and a difference lies in that the three have different permission, where the main official account has the highest permission, and the personal account has the lowest permission.

In one embodiment, after acknowledgement of the sub official account, the main official account may use the sub official account as a subordinate account of the main official account, and the main official account has the permission to view or download the operational data of the subordinate sub official account.

The main official account may set, without acknowledgement of the sub official account or the personal account, the personal account as the subordinate account of the subordinate sub official account of the main official account; and the main official account has the permission to view or download the operational data of the subordinate sub official account.

The main official account may delete the sub official account subordinate to the main official account, or the personal account, and acknowledgement of the sub official account or the personal account is not needed during deletion.

When the sub official account receives the invitation information of the main official account, the sub official account has the right to decide whether to agree to be used as the subordinate account of the main official account.

The personal account does not receive invitation information of the main official account, and has no right to decide whether to agree to be used as the subordinate account of the sub official account subordinate to the main official account, and so on.

In the foregoing method, the main official account or the sub official account sends and receives information by using a client in use.

The main official account may further delete the sub official account subordinate to the main official account, or the personal account, and acknowledgement of an account to be deleted is not needed during deletion. A specific manner may be that: the server receives a request for deleting the sub official account subordinate to the main official account, or the personal account, recovers the sub official account or the personal account to a common microblog account according to the request, and stops displaying the operational data of the microblog account to the main official account.

In addition, the main official account may further recommend a sub official account subordinate to the main official account, or a personal account to the server, or stop a recommendation. A specific manner may be that:

the server receives a recommendation request including a sub official account or a personal account, and mainly displays microblog information of the sub official account or the personal account according to the recommendation request, or the server receives a recommendation stop request including a sub official account or a personal account, and stops, according to the recommendation stop request, main display of microblog information of the sub official account or the personal account.

In step 101, a manner in which the server sets the microblog account 1 as the main official account may be that:

the server receives, from the microblog account 1, a request for activating the main official account, and sets, after verification of the request succeeds, the microblog account 1 as the main official account; or the server receives a command input by a microblog operation staff, and sets the microblog account 1 as the main official account according to the command.

In the foregoing method, a manner in which the main official account or the sub official account sends the information by using the client may be that: a microblog operation staff operates manually, sends a microblog direct message, sends a cell phone short message service message, or sends an e-mail, or the like.

In the foregoing process, the invitation information sent by the main official account to the microblog account 2 may be: a preset website link.

If the microblog account 2 agrees to be used as the sub official account subordinate to the main official account, the website link may be clicked, and a request for accessing the website link is the message that is subsequently sent to the server and indicates that the microblog account 2 is used as the sub official account subordinate to the main official account.

In the foregoing method, the operational data may specifically be: the number of messages, the number of followers, the number of comments, or the number of rebroadcasts. The main official account may view or download the operational data of the subordinate sub official account and the subordinate personal account, and a format of downloaded data may be text or an Excel table.

The main official account may query, in a manner of microblog search or batch import of files, a microblog account that may be used as a sub official account subordinate to the main official account, or used as a personal account, and a format of the queried content may be text, an Excel table, or the like.

Figure 3:
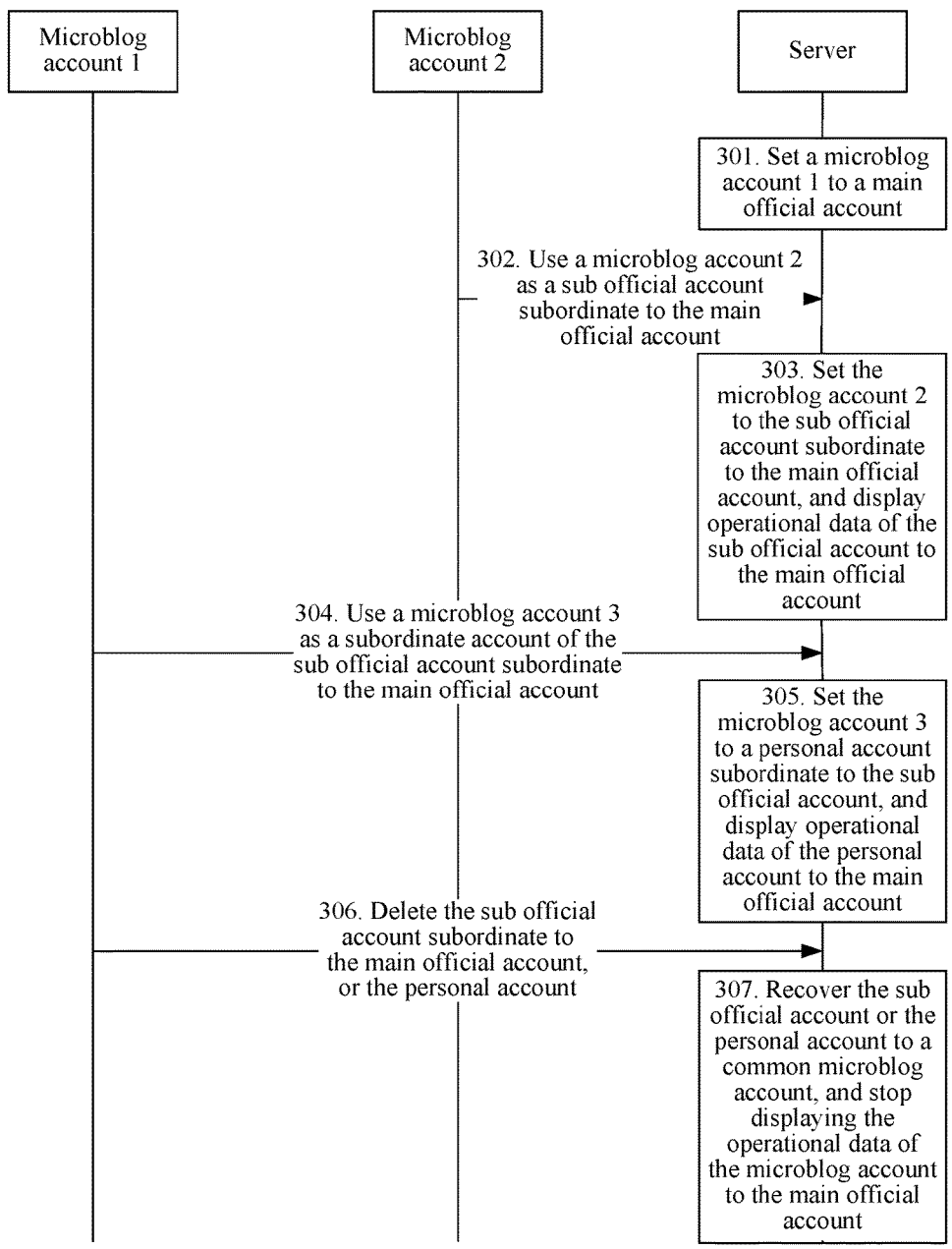
FIG. 3 is an implementation flowchart of another exemplary method for constructing a microblog management circle according to the present disclosure.

The present disclosure further provides another exemplary method for constructing a microblog management circle. As shown in FIG. 3, the method includes:

Step 301: A server sets a microblog account 1 as a main official account.

Step 302: The main official account or a microblog account 2 sends a message indicating that the microblog account 2 is used as a sub official account subordinate to the main official account to the server (FIG. 3 shows that the microblog account 2 sends the message to the server).

Step 303: The server sets, according to the message, the microblog account 2 as the sub official account subordinate to the main official account, and displays operational data of the sub official account subordinate to the main official account to the main official account.

The foregoing method may further include:

Step 304: The main official account selects a microblog account 3, and sends a request for using the microblog account 3 as a subordinate account of the sub official account subordinate to the main official account to the server.

Step 305: The server sets, according to the request, the microblog account 3 as a personal account subordinate to the sub official account, and displays operational data of the personal account subordinate to the sub official account to the main official account.

Step 306: The main official account sends a request for deleting a sub official account subordinate to the main official account or deleting a personal account to the server.

Step 307: The server recovers the sub official account or the personal account to a common microblog account according to the request, and stops displaying the operational data of the microblog account to the main official account.

A specific embodiment is used below for detailed description.

Embodiment 1

Figure 4:
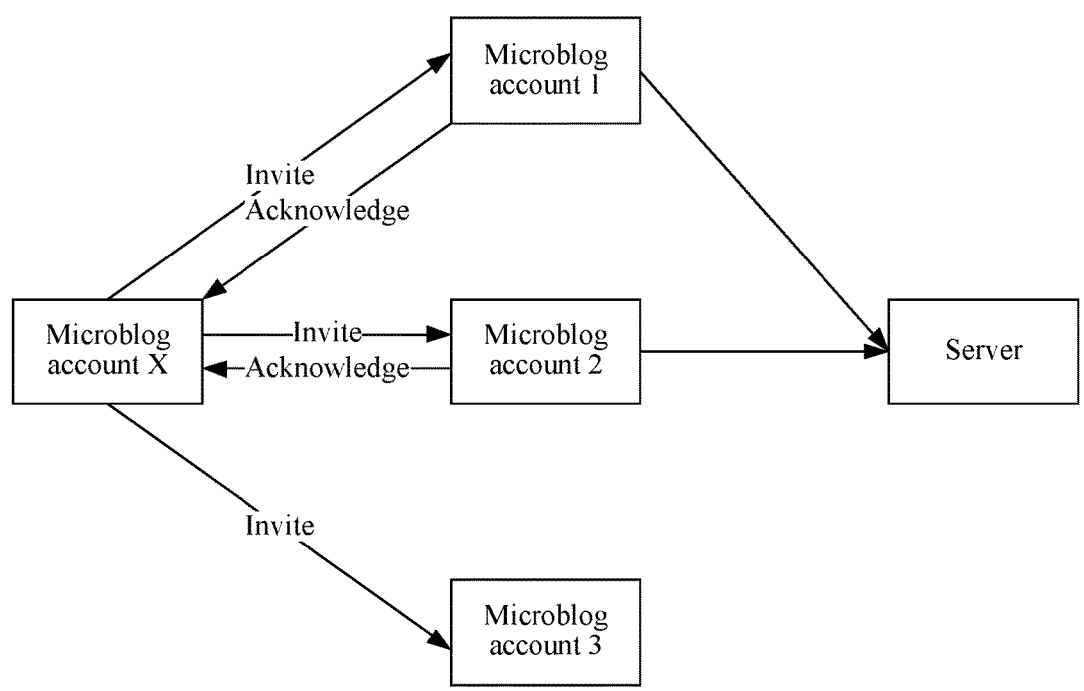
FIG. 4 is a schematic diagram of an application scenario in Embodiment 1 according to various embodiments of the present disclosure.

In this embodiment, a microblog media management circle constructed with a microblog account X as a manager is introduced. In this embodiment, a main official account may specifically be a media main official account, which is a microblog account operated by a media mechanism; a sub official account may specifically be a media sub official account, which is a microblog account operated by a subordinate unit of the media mechanism, where the subordinate unit performs an independent operation; and a personal account may specifically be a media worker account, which is a personal microblog account of a subordinate staff member of the media mechanism. FIG. 4 is a schematic diagram of an exemplary application scenario in this embodiment. This embodiment includes the following steps:

Step 401: A microblog account X sends a request for activating a media main official account to a server, and after verification by the server succeeds, the server sets the microblog account X as the media main official account. A microblog operation staff may also directly set the microblog account X as the media main official account by using the server. Herein, the microblog account X may be a microblog account operated by a media mechanism.

Step 402: The microblog account X finds three microblog accounts, that is, a microblog account 1, a microblog account 2, and a microblog account 3, operated by a subordinate unit of the media mechanism, sends invitation information to the microblog account 1, the microblog account 2, and the microblog account 3 separately, to invite them to be used as media sub official accounts subordinate to the microblog account X.

Step 403: The microblog account 1 and the microblog account 2 agree to be used as the media sub official accounts subordinate to the microblog account X, separately return acknowledgement information to the microblog account X, and separately send a message indicating that the microblog account 1 and the microblog account 2 agree to be used as the media sub official accounts subordinate to the microblog account X to the server; and the server sets, according to the message, the microblog account 1 and the microblog account 2 as the media sub official accounts subordinate to the microblog account X, and displays operational data of the microblog account 1 and microblog account 2 to the microblog account X. In another embodiment of the present disclosure, it may be that after the microblog account X receives the acknowledgement information of the microblog account 1 or the microblog account 2, the microblog account X sends the message indicating that the microblog account 1 or the microblog account 2 agrees to be used as the media sub official account subordinate to the microblog account X to the server; or, the microblog account 1, the microblog account 2, and the microblog account 3 separately send invitation information to the microblog account X, to request to be used as the media sub official accounts subordinate to the microblog account X; or, the server sends invitation information to the microblog account X, the microblog account 1, the microblog account 2, and the microblog account 3 separately, to request to set the microblog account 1, the microblog account 2, and the microblog account 3 as the media sub official accounts subordinate to the microblog account X.

If the microblog account 3 does not agree to be used as the media sub official account subordinate to the microblog account X, the invitation information may be ignored, and the invitation information becomes invalid automatically after a preset time period; or the microblog account 3 may also return refusal information to the microblog account X.

Step 404: The microblog account X finds that a microblog account 1a and a microblog account 1b are personal microblog accounts of a media unit represented by the microblog account 1, and sends a request for using the microblog account 1a and the microblog account 1b as media worker accounts subordinate to the microblog account 1 to the server; and the server uses, according to the request, the microblog account 1a and the microblog account 1b as the media worker accounts subordinate to the microblog account 1, and displays operational data of the microblog account 1a and the microblog account 1b to the microblog account X.

The microblog account X finds that a microblog account 2a, a microblog account 2b, and a microblog account 2c are personal microblog accounts of a media unit represented by the microblog account 2, and sends a request for using the microblog account 2a, the microblog account 2b, and the microblog account 2c as media worker accounts subordinate to the microblog account 2 to the server; and the server uses, according to the request, the microblog account 2a, the microblog account 2b, and the microblog account 2c as the media worker accounts subordinate to the microblog account 2, and displays operational data of the microblog account 2a, the microblog account 2b, and the microblog account 2c to the microblog account X.

Figure 5:
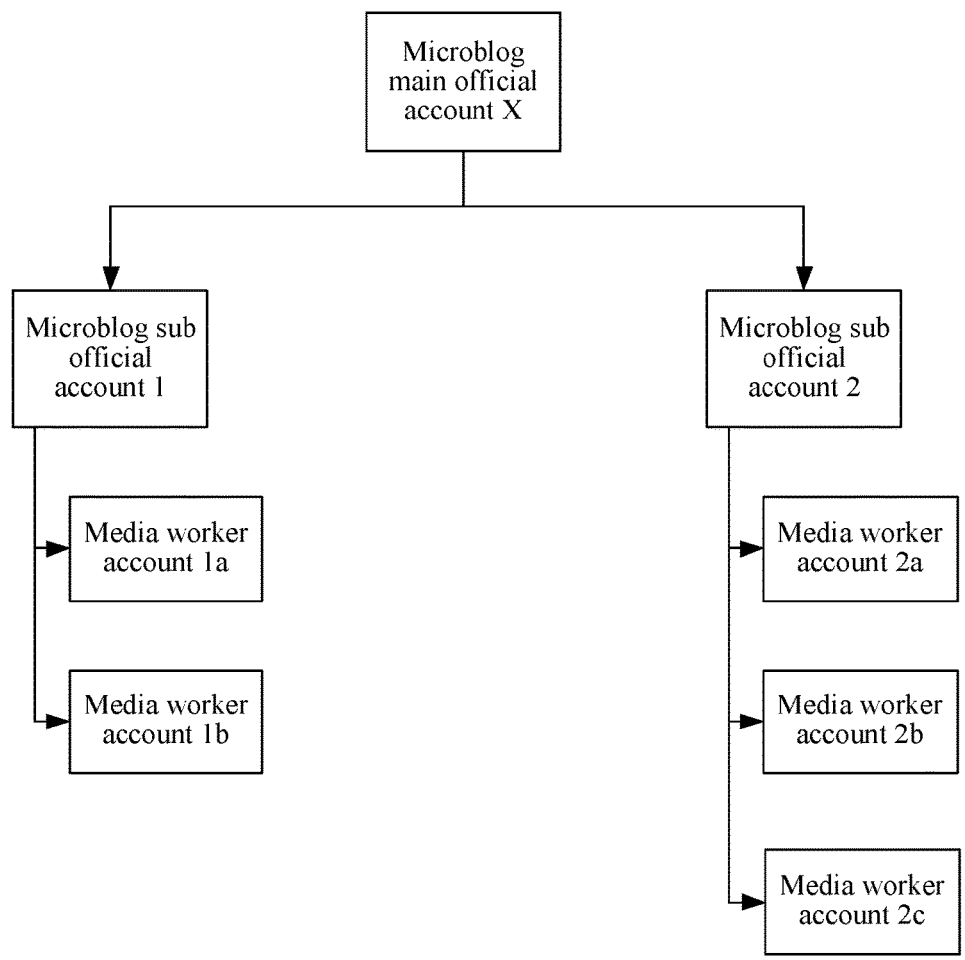
FIG. 5 is a schematic structural diagram of a constructed microblog management circle in Embodiment 1 according to various embodiments of the present disclosure.

For example, the microblog media management circle constructed by using the foregoing process is shown in FIG. 5.

Then, the microblog account X may recommend a subordinate media sub official account or a subordinate media worker account to the server. After receiving the recommendation, the server may mainly display microblog information of the recommended media sub official account or the recommended media worker account. The microblog account X may also send a recommendation stop request to the server, and the server stops, according to the request, main display of the microblog information of the related media sub official account or the related media worker account.

Figure 6:
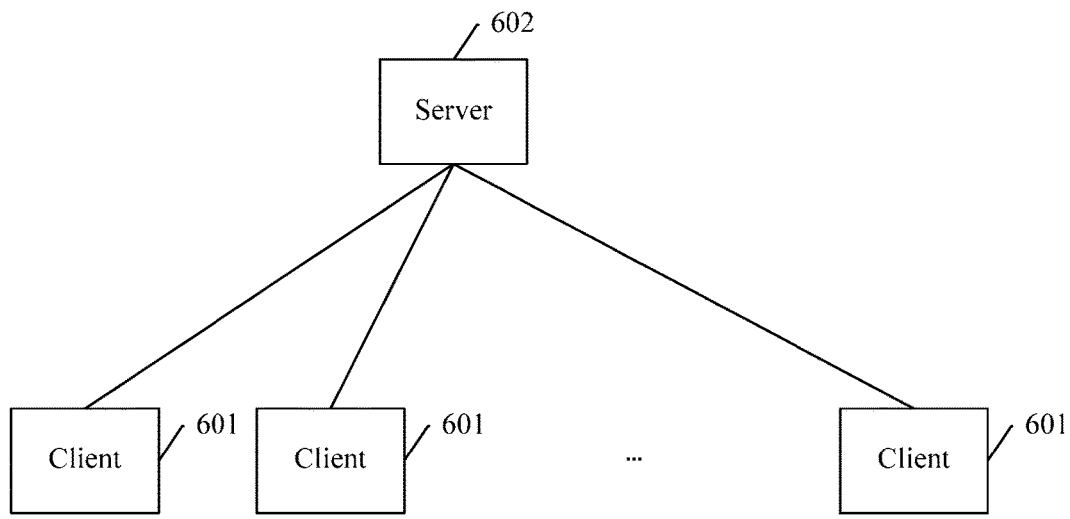
FIG. 6 is a structural diagram of an exemplary system for constructing a microblog management circle according to the present disclosure.

The present disclosure further provides an exemplary system for constructing a microblog management circle. FIG. 6 is a schematic structural diagram of the system, which includes:

a client 601, configured to send a message indicating that a microblog account is used as a sub official account subordinate to a main official account to a server 602; and a server 602, configured to set the main official account; set, when the message is received, the microblog account as the sub official account subordinate to the main official account; and display operational data of the sub official account to the main official account.

In the foregoing system, the client 601 is further configured to send, when a microblog account using the client is the main official account, a request for using the microblog account as a subordinate account of the sub official account subordinate to the main official account to the server 602.

The server 602 sets, according to the request, the microblog account as a personal account subordinate to the sub official account, and displays operational data of the personal account subordinate to the sub official account to the main official account.

The client 601 is further configured to send, when the microblog account using the client is the main official account, a request for deleting a sub official account subordinate to the main official account or deleting a personal account to the server 602.

The server 602 recovers the sub official account or the personal account to a common microblog account according to the request, and stops displaying the operational data of the microblog account to the main official account.

Figure 7:
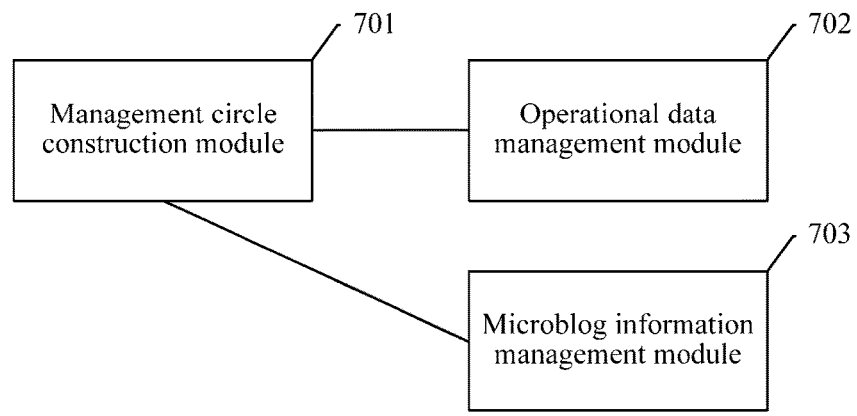
FIG. 7 is a schematic structural diagram of an exemplary server for constructing a microblog management circle according to the present disclosure.

The present disclosure further provides an exemplary server for constructing a microblog management circle. FIG. 7 is a schematic structural diagram of the server, which includes:

a management circle construction module 701, configured to set a microblog account 1 as a main official account, and set, when a message indicating that a microblog account 2 is used as a sub official account subordinate to the main official account is received, the microblog account 2 to the sub official account subordinate to the main official account; and an operational data management module 702, configured to display operational data of the sub official account subordinate to the main official account to the main official account.

The management circle construction module 701 is further configured to set, when a request for using a microblog account 3 as a subordinate account of the sub official account subordinate to the main official account is received, the microblog account 3 as a personal account subordinate to the sub official account.

The operational data management module 702 may further be configured to display operational data of the personal account subordinate to the sub official account to the main official account.

The management circle construction module 701 may further be configured to recover, when a request for deleting a sub official account subordinate to the main official account or deleting a personal account is received, the sub official account or the personal account to a common microblog account.

The foregoing server may also include:

a microblog information management module 703, configured to receive a recommendation request including a sub official account or a personal account, and mainly display microblog information of the sub official account or the personal account according to the request.

The microblog information management module 703 is further configured to receive a recommendation stop request including a sub official account or a personal account, and stop, according to the recommendation stop request, main display of the microblog information of the sub official account or the personal account.

Figure 8:
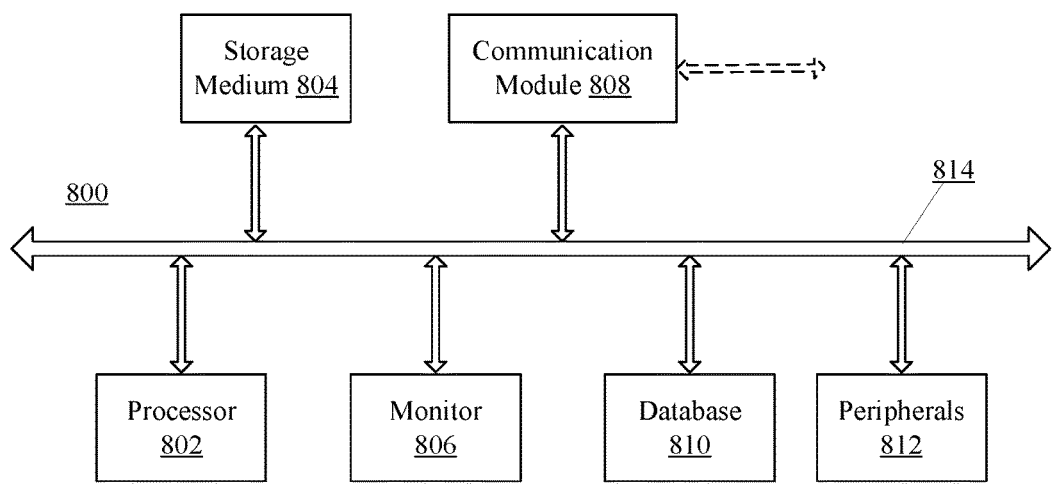
FIG. 8 illustrates an exemplary computer system consistent with various disclosed embodiments.

In various embodiments, the client device, the server, and/or various modules/units disclosed herein may be implemented using one or more computing/computer systems. FIG. 8 illustrates an exemplary computing system.

As shown in FIG. 8, a computing system 800 may include a processor 802, a storage medium 804, a monitor 806, a communication module 808, a database 810, peripherals 812, and one or more bus 814 to couple the devices together. Certain devices may be omitted and other devices may be included.

Processor 802 can include any appropriate processor or processors. Further, processor 802 can include multiple cores for multi-thread or parallel processing. Storage medium 804 may include memory modules, such as ROM, RAM, and flash memory modules, and mass storages, such as CD-ROM, U-disk, removable hard disk, etc. Storage medium 804 may store computer programs for implementing various processes, when executed by processor 802.

Further, peripherals 812 may include I/O devices such as keyboard and mouse, and communication module 808 may include network devices for establishing connections through the communication network as indicated in FIG. 7. Database 810 may include one or more databases for storing certain data and for performing certain operations on the stored data, such as webpage browsing, database searching, etc.

The processor(s) 802 can upload executable files corresponding to processes of one or more programs/instructions to the storage medium 804, such as a non-transitory storage medium. The processor(s) 802 can then be used to run these one or more programs stored in the storage medium 804. For example, the processor(s) 802 can cause the exemplary device to perform disclosed methods for constructing a microblog management circle.

In this manner, the disclosed methods, the system, and the server for constructing a microblog management circle may introduce an organization structure into microblog, so that, based on a mechanism having scattered and/or decentralized accounts, an organization mechanism circle, that is organization-manageable, resource-sharable, content-aggregatable, and performance-quantifiable, may be formed. The present disclosure is applicable to a media mechanism to effectively manage subordinate media microblog accounts, is applicable for an account having a great influence to recommend another subordinate account, is applicable to aggregate premium microblog content of the media mechanism and its subordinate mechanism, and is applicable to strengthen cohesion and influence of the media microblog accounts, so as to create a fine brand of a media microblog.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for constructing a microblog management circle, comprising:

setting, by a server, a microblog account 1 to a main official account; and receiving, by the server, a message indicating that a microblog account 2 is used as a sub official account subordinate to the main official account, setting, according to the message, the microblog account 2 to the sub official account subordinate to the main official account, and displaying operational data of the sub official account subordinate to the main official account to the main official account.

2. The method according to claim 1, after the setting, by a server, a microblog account 1 to a main official account, further comprising: sending, by the main official account, invitation information to the microblog account 2; and acknowledging, by the microblog account 2, that the microblog account 2 agrees to be used as the sub official account subordinate to the main official account, and sending the message indicating that the microblog account 2 is used as the sub official account subordinate to the main official account to the server; or after the setting, by a server, a microblog account 1 to a main official account, further comprising: sending, by the main official account, invitation information to the microblog account 2, feeding back, by the microblog account 2, acknowledgement information to the main official account, and sending, by the main official account, the message indicating that the microblog account 2 is used as the sub official account subordinate to the main official account to the server; or after the setting, by a server, a microblog account 1 to a main official account, further comprising: sending, by the microblog account 2, invitation information to the main official account, and acknowledging, by the main official account, that the main official account agrees to use the microblog account 2 as the sub official account subordinate to the main official account, and sending the message indicating that the microblog account 2 is used as the sub official account subordinate to the main official account to the server; or after the setting, by a server, a microblog account 1 to a main official account, further comprising: sending, by the microblog account 2, invitation information to the main official account, feeding back, by the main official account, acknowledgement information to the microblog account 2, and sending, by the microblog account 2, the message indicating that the microblog account 2 is used as the sub official account subordinate to the main official account to the server; or after the setting, by a server, a microblog account 1 to a main official account, further comprising: sending, by the server, invitation information indicating that the microblog account 2 is used as the sub official account subordinate to the main official account to the main official account and the microblog account 2 separately; sending, by the microblog account 2, acknowledgement information to the main official account; and acknowledging, by the main official account, that the main official account agrees to use the microblog account 2 as the sub official account subordinate to the main official account, and sending the message indicating that the microblog account 2 is used as the sub official account subordinate to the main official account to the server; or after the setting, by a server, a microblog account 1 to a main official account, further comprising: sending, by the server, invitation information indicating that the microblog account 2 is used as the sub official account subordinate to the main official account to the main official account and the microblog account 2 separately;
sending, by the main official account, acknowledgement information to the microblog account 2; and
acknowledging, by the microblog account 2, that the microblog account 2 agrees to be used as the sub official account subordinate to the main official account, and sending the message indicating that the microblog account 2 is used as the sub official account subordinate to the main official account to the server.

3. The method according to claim 1, wherein the method further comprises:
receiving, by the server, a request for using a microblog account 3 as a subordinate account of the sub official account subordinate to the main official account, setting, according to the request, the microblog account 3 to a personal account subordinate to the sub official account, and displaying operational data of the personal account subordinate to the sub official account to the main official account.

4. The method according to claim 3, wherein the method further comprises:
receiving, by the server, a request for deleting a sub official account subordinate to the main official account or deleting a personal account, recovering the sub official account or the personal account to a common microblog account according to the request, and stopping displaying the operational data of the microblog account to the main official account.

5. The method according to claim 3, wherein the method further comprises:
receiving, by the server, a recommendation request comprising a sub official account or a personal account, and mainly displaying microblog information of the sub official account or the personal account according to the recommendation request.

6. The method according to claim 5, wherein the method further comprises:
receiving, by the server, a recommendation stop request comprising a sub official account or a personal account, and stopping, according to the recommendation stop request, main display of the microblog information of the sub official account or the personal account.

7. The method according to claim 1, wherein a manner in which the server sets the microblog account 1 to the main official account is:
receiving, by the server from the microblog account 1, a request for activating the main official account, and setting, after verification of the request succeeds, the microblog account 1 to the main official account; or
receiving, by the server, a command input by a microblog operation staff, and setting the microblog account 1 to the main official account according to the command.

8. The method according to claim 2, wherein the invitation information sent by the main official account to the microblog account 2 is: a preset website link; and
the microblog account 2 accesses the website link, and uses a request for accessing the website link as the message that is sent to the server and indicates that the microblog account 2 is used as the sub official account subordinate to the main official account.

9. A method for constructing a microblog management circle, comprising:
setting, by a server, a microblog account 1 to a main official account;
sending, by the main official account or a microblog account 2, a message indicating that the microblog account 2 is used as a sub official account subordinate to the main official account to the server; and
setting, by the server according to the message, the microblog account 2 to the sub official account subordinate to the main official account, and displaying operational data of the sub official account subordinate to the main official account to the main official account.

10. The method according to claim 9, wherein the method further comprises:
selecting, by the main official account, a microblog account 3, and sending a request for using the microblog account 3 as a subordinate account of the sub official account subordinate to the main official account to the server; and
setting, by the server according to the request, the microblog account 3 to a personal account subordinate to the sub official account, and displaying operational data of the personal account subordinate to the sub official account to the main official account.

11. The method according to claim 9, wherein the method further comprises:
sending, by the main official account, a request for deleting a sub official account subordinate to the main official account or deleting a personal account to the server; and
recovering, by the server, the sub official account or the personal account to a common microblog account according to the request, and stopping displaying the operational data of the microblog account to the main official account.

12. A system for constructing a microblog management circle, comprising:
a client, configured to send a message indicating that a microblog account is used as a sub official account subordinate to a main official account to a server; and
a server, configured to set the main official account; set, when the message is received, the microblog account to the sub official account subordinate to the main official account; and display operational data of the sub official account to the main official account.

13. The system according to claim 12, wherein
the client is further configured to send, when a microblog account using the client is the main official account, a request for using the microblog account as a subordinate account of the sub official account subordinate to the main official account to the server; and
the server sets, according to the request, the microblog account to a personal account subordinate to the sub official account, and displays operational data of the personal account subordinate to the sub official account to the main official account.

14. The system according to claim 12, wherein
the client is further configured to send, when the microblog account using the client is the main official account, a request for deleting a sub official account subordinate to the main official account or deleting a personal account to the server; and
the server recovers the sub official account or the personal account to a common microblog account according to the request, and stops displaying the operational data of the microblog account to the main official account.

15. The system according to claim 12, wherein the server includes:
a management circle construction module, configured to set a microblog account 1 to a main official account, and set, when a message indicating that a microblog account 2 is used as a sub official account subordinate to the main official account is received, the microblog account 2 to the sub official account subordinate to the main official account; and an operational data management module, configured to display operational data of the sub official account subordinate to the main official account to the main official account.

16. The system according to claim 15, wherein the management circle construction module is further configured to set, when a request for using a microblog account 3 as a subordinate account of the sub official account subordinate to the main official account is received, the microblog account 3 to a personal account subordinate to the sub official account; and the operational data management module is further configured to display operational data of the personal account subordinate to the sub official account to the main official account.

17. The system according to claim 16, wherein the management circle construction module is further configured to recover, when a request for deleting a sub official account subordinate to the main official account or deleting a personal account is received, the sub official account or the personal account to a common microblog account.

18. The system according to claim 16, wherein the server further comprises:

a microblog information management module, configured to receive a recommendation request comprising a sub official account or a personal account, and mainly display microblog information of the sub official account or the personal account according to the request.

19. The system according to claim 18, wherein the microblog information management module is further configured to receive a recommendation stop request comprising a sub official account or a personal account, and stop, according to the request, main display of the microblog information of the sub official account or the personal account.

\* \* \* \* \*